(12) United States Patent
Yamamura et al.

(10) Patent No.: US 6,848,711 B2
(45) Date of Patent: Feb. 1, 2005

(54) VEHICULAR PASSENGER PROTECTING APPARATUS

(75) Inventors: Daisuke Yamamura, Aichi (JP); Noritaka Nagayama, Aichi (JP); Takashi Yamafuji, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/336,759

(22) Filed: Jan. 6, 2003

(65) Prior Publication Data

US 2003/0178822 A1 Sep. 25, 2003

(30) Foreign Application Priority Data

Mar. 20, 2002 (JP) .................................... P. 2002-079468

(51) Int. Cl.⁷ ............................................. B60R 21/22
(52) U.S. Cl. ................... 280/730.2; 280/743.2
(58) Field of Search .................... 280/730.2, 743.2, 280/728.2

(56) References Cited

U.S. PATENT DOCUMENTS

| | | | |
|---|---|---|---|
| 5,791,683 A | * | 8/1998 | Shibata et al. ............ 280/730.2 |
| 6,224,091 B1 | * | 5/2001 | Eyrainer et al. ......... 280/730.2 |
| 6,237,943 B1 | * | 5/2001 | Brown et al. ............. 280/730.2 |
| 6,375,214 B1 | * | 4/2002 | Nishikaji ................. 280/728.2 |

FOREIGN PATENT DOCUMENTS

JP 2001-16014 A 1/2001

* cited by examiner

*Primary Examiner*—David R. Dunn
(74) *Attorney, Agent, or Firm*—Birch, Stewart, Kolasch, & Birch, LLP

(57) ABSTRACT

A vehicular passenger protecting apparatus preferably used in an air bag to be spread at a side portion in a vehicular compartment of an automobile. The apparatus includes an air bag main body to be expanded to spread from an upper side of a side portion of a vehicle to an inside of a vehicular compartment, a pillar portion of the vehicle, a trim member for covering an inner side of the pillar portion of the vehicle and forming a gap between the trim member and the pillar portion, a strap for connecting the air bag main body and the pillar portion arranged at an inside of a space surrounded by the pillar portion and the trim member, and a strap holding member arranged at the inside of the space. The strap holding member holds the strap releasably in a predetermined direction. The strap holding member is disposed to direct in the predetermined direction towards the gap.

15 Claims, 5 Drawing Sheets

VEHICULAR PASSENGER PROTECTING APPARATUS

BACKGROUND OF THE INVENTION

1. Field of the Invention

The present invention relates to a vehicular passenger protecting apparatus preferably used in an air bag developed at a side portion in a vehicular compartment of an automobile.

2. Background Art

Conventionally, air bags of a driver seat and a passenger seat next to driver seat have widely been spread as one of safety apparatus of an automobile. Further, in addition to the air bags at front seats, in recent years, an air bag developed in a side direction at inside of a vehicular compartment is also spreading. In the air bag provided in the side direction, other than a so-called side air bag provided at a side of a seat, as shown by FIG. 9, a so-called curtain air bag 1 to be spread from a front pillar 11 over to a rear pillar 13 has been developed and reduced into practice.

According to the curtain air bag 1, an air bag main body 2 is stored in a side roof rail 12 along a vehicle length direction and when strong impact is effected from a side of a vehicle by collision or the like, the air bag main body 2 is spread to totally cover a side face of the inside of the regular compartment to alleviate impact to a passenger (particularly, impact to the head portion).

Meanwhile, there is the curtain air bag 1 in which a front side lower end of the air bag main body 2 and the front pillar 11 are connected by a strap (string) 3. This is because although an upper side of the air bag main body 2 is fixed to the side roof rail 12, a lower end thereof constitutes a free end and therefore, it is necessary to regulate a position of the lower end of the air bag main body 2 in expanding to develop the air bag 1.

Further, by regulating the lower end position of the bag main body 2 by the strap 3, operation of expanding to develop the air bag 1 is made ideal.

Here, FIG. 10 is a schematic perspective view of the vehicle and FIG. 11 is a sectional view taken along a line A—A in FIG. 10. As shown by FIG. 11, the front pillar 11 includes an outer panel 11a, an inner panel 11b formed in a closed section and a reinforcement 11c as a reinforcing member provided at inside of the inner panel 11b. Further, a compartment inner side of the inner panel 11b is covered by a pillar trim 14 and a harness 15 for an electric equipment is arranged between the pillar trim 14 and the inner panel 11b. Further, a front window 20 is fixed at an end portion of the front pillar 11.

Further, a weather strip 16 is fitted to edge portions of the inner panel 11b and the pillar trim 14 and an opening between the inner panel 11b and the pillar trim 14 is closed by the weather strip 16.

Further, the above-described strap 3 is arranged along an interval between the pillar trim 14 and the inner pillar 11b. Further, as explained in reference to FIG. 9, one end of the strap 3 is fixed to the pillar 11 and other end thereof is connected to the front lower end of the air bag main body 2.

Further, in developing the air bag 1, the strap 3 is pulled out from a gap between the pillar trim 14 and the weather strip 16 in accordance with expansion of the air bag main body 2.

However, according to the prior art, a middle portion (other than both end portions) of the strap 3 is not fixed at all at inside of the front pillar 11 and a position of arranging the strap 3 is not determined at inside of the front pillar 11. Therefore, there is a possibility that the strap is caught by an edge portion of the pillar trim 14 to make the pillar trim 14 jump to be detached.

Further, it cannot be predicted how the strap 3 comes out from the pillar 11 in developing the air bag 1 and therefore, depending on cases, there also is a concern that the strap 3 is caught by the edge portion of the pillar trim 14 in developing the air bag 1 and ideal development of the air bag 1 is hampered.

Further, in Japanese Patent Laid-Open No. 16014/2001, in order to resolve a problem similar to the above-described, there is disclosed a constitution of providing a guide member for guiding an ejecting direction of a strap between a pillar trim and the weather strip at inside of a pillar.

However, even in such a technology, a middle portion of the strap is not fixed at all similarly at inside of the pillar and therefore, the strap cannot completely be prevented from being caught by the pillar trim. Further, it is necessary to provide the above-described guide member by an amount of a length of the pillar along the length direction of the pillar and there poses a problem of increasing cost.

SUMMARY OF THE INVENTION

The invention has been created in view of the problem and it is an objective thereof to provide a vehicular passenger protecting apparatus capable of pulling out a strap from a gap between a pillar trim and a weather strip firmly in developing an air bag by a simple constitution.

A vehicular passenger protecting apparatus according to the invention comprises an air bag main body developed to expand from an upper side of a side portion of a vehicle to inside of a vehicular compartment, a pillar portion of the vehicle, a trim member for covering a vehicular compartment inner side of a pillar portion of the vehicle and forming a gap toward the inner side of the vehicular compartment between the trim member and an edge portion of the pillar portion, a strap arranged at inside of a space closed by the pillar portion and the trim member for connecting the air bag main body and the pillar portion, and a strap holding member arranged at inside of the space for holding the strap releasably in a predetermined direction. The strap holding member is disposed to direct in the predetermined direction towards the gap.

Further, preferably, there is provided a seal member having a tongue piece for covering a gap between an edge portion of the trim member and the edge portion of the pillar portion. In this case, it is preferable to mold the tongue piece by an elastic body of rubber, elastomer or the like.

Further, according to the vehicular passenger protecting apparatus of the invention, the vehicle includes a head lining arranged on a vehicular compartment inner side of a ceil portion, and the strap holding member is arranged at a vicinity of a portion where the trim member and the head lining overlaps each other.

Further, the vehicular passenger protecting apparatus of the invention, the strap holding member is a clip attached to the edge portion of the pillar portion.

Further, preferably, a plurality of panels overlap at the edge portion of the pillar portion and a gap is formed between contiguous panels. When the constitution is constructed in this way, attachment of the clip is facilitated by inserting an end portion of the clip into the gap. Further, a hole portion may be formed in place of the gap. In this case, a projected portion may be provided at the end portion of the clip and inserted into the hole portion.

Further preferably, the clip comprises a base portion engaged with the edge portion of the pillar portion and a holding portion for holding the strap and is formed such that a section thereof is formed substantially in an S-like shape. Thereby, elastic force is produced by the clip per se and the attachment to the pillar portion is further facilitated and becomes difficult from being detached from the pillar portion.

Further preferably, the holding portion is constituted to comprise a fold back portion extended from the base portion and a front end portion formed toward the gap.

Further, according to the vehicular passenger protecting apparatus of the invention, the strap holding member is a harness holding member capable of holding a harness arranged at inside of the space.

According to the invention, a vehicular passenger protecting apparatus comprises an air bag main body to be expanded to spread from an upper side of a side portion of a vehicle to an inside of a vehicular compartment, a pillar portion of the vehicle, a trim member for covering a vehicular compartment inner side of the pillar portion of the vehicle and forming a gap between the trim member and the pillar portion, a seal member having a tongue piece for covering the gap, a strap for connecting the air bag main body and the pillar portion arranged at an inside of a space surrounded by the pillar portion and the trim member, a strap holding member arranged at the inside of the space and attached to an edge portion of the pillar portion. The strap holding member includes a holding portion for holding the strap releasably. The holding portion directs towards the gap. The edge portion of the pillar portion is extended in the same direction as the holding portion. The seal member is attached to the edge portion of the pillar portion to cover a portion where the strap holding member is attached.

According to the invention, a vehicular passenger protecting apparatus comprises an air bag main body to be expanded to spread from an upper side of a side portion of a vehicle to an inside of a vehicular compartment, a pillar portion of the vehicle, a trim member for covering a vehicular compartment inner side of the pillar portion of the vehicle and forming a gap between the trim member and the pillar portion, a seal member having a tongue piece for covering the gap, a strap for connecting the air bag main body and the pillar portion arranged at an inside of a space surrounded by the pillar portion and the trim member, and a strap holding member arranged at the inside of the space and attached to the pillar portion. The strap holding member includes a strap holding portion for holding the strap releasably and a harness holding portion for holding a harness arranged in the space. The holding portion directing towards the gap. The edge portion of the pillar portion is extended in the same direction as the strap holding portion. The seal member is attached to the edge of the pillar portion.

DETAILED DESCRIPTION OF THE PREFERRED EMBODIMENTS

An explanation will be given of embodiments of the invention in reference to the drawings as follows.

Figure 1:
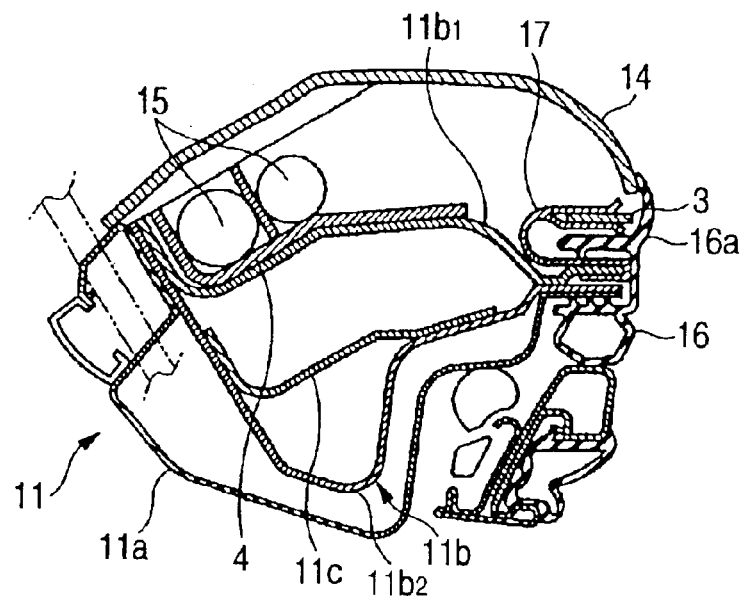
FIG. 1 is a schematic sectional view showing a constitution of an essential portion of a vehicular passenger protecting apparatus according to a first embodiment of the invention.
Figure 2:
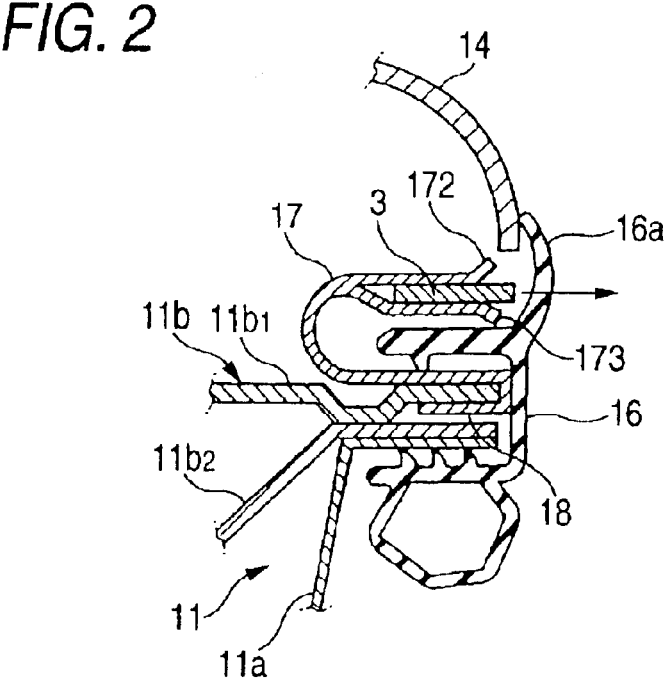
FIG. 2 is a schematic sectional view showing the constitution of the essential portion of the vehicular passenger protecting apparatus according to the first embodiment and is a view showing to enlarge FIG. 1.
Figure 3:
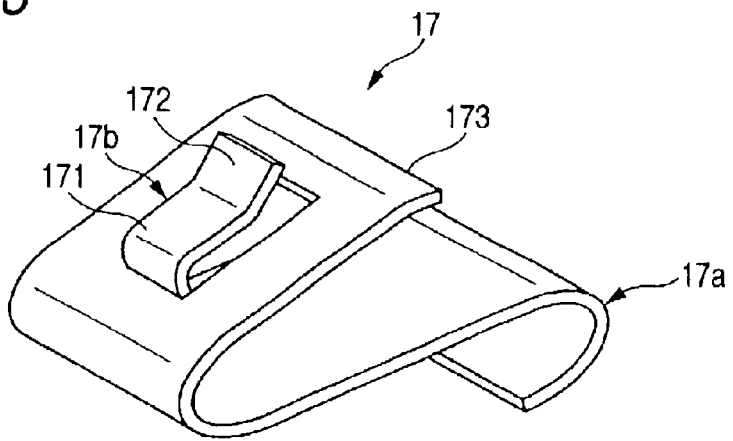
FIG. 3 is a schematic view showing an example of a strap holding portion in the vehicular passenger protecting apparatus according to the first embodiment of the invention.
Figure 4:
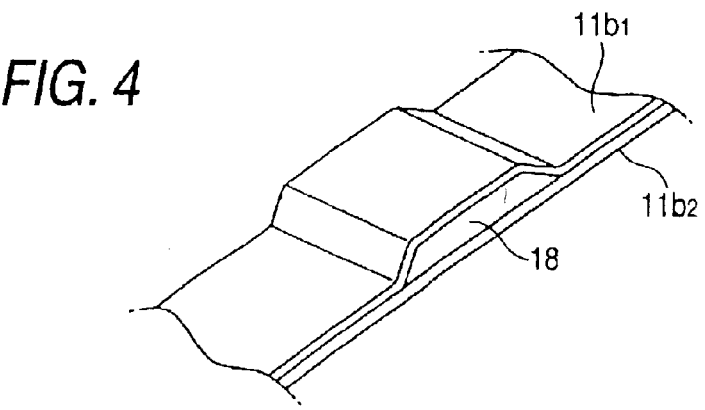
FIG. 4 is a schematic perspective view showing an edge portion of a pillar of a vehicle to which the vehicular passenger protecting apparatus according to the first embodiment of the invention is applied.
Figure 5:
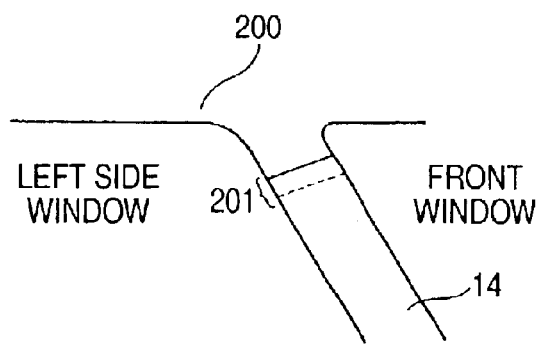
FIG. 5 is a schematic view showing inside of a vehicular compartment of the vehicle to which the vehicular passenger protecting apparatus according to the first embodiment of the invention is applied.
Figure 6:
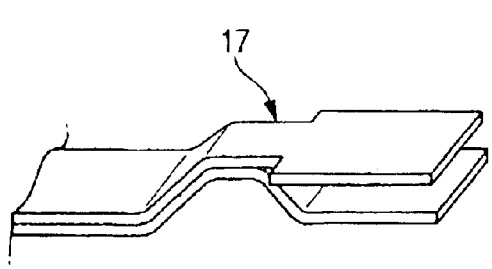
FIG. 6 is a schematic view showing other example of a strap holding member in the vehicular passenger protecting apparatus according to the first embodiment of the invention.
Figure 11:
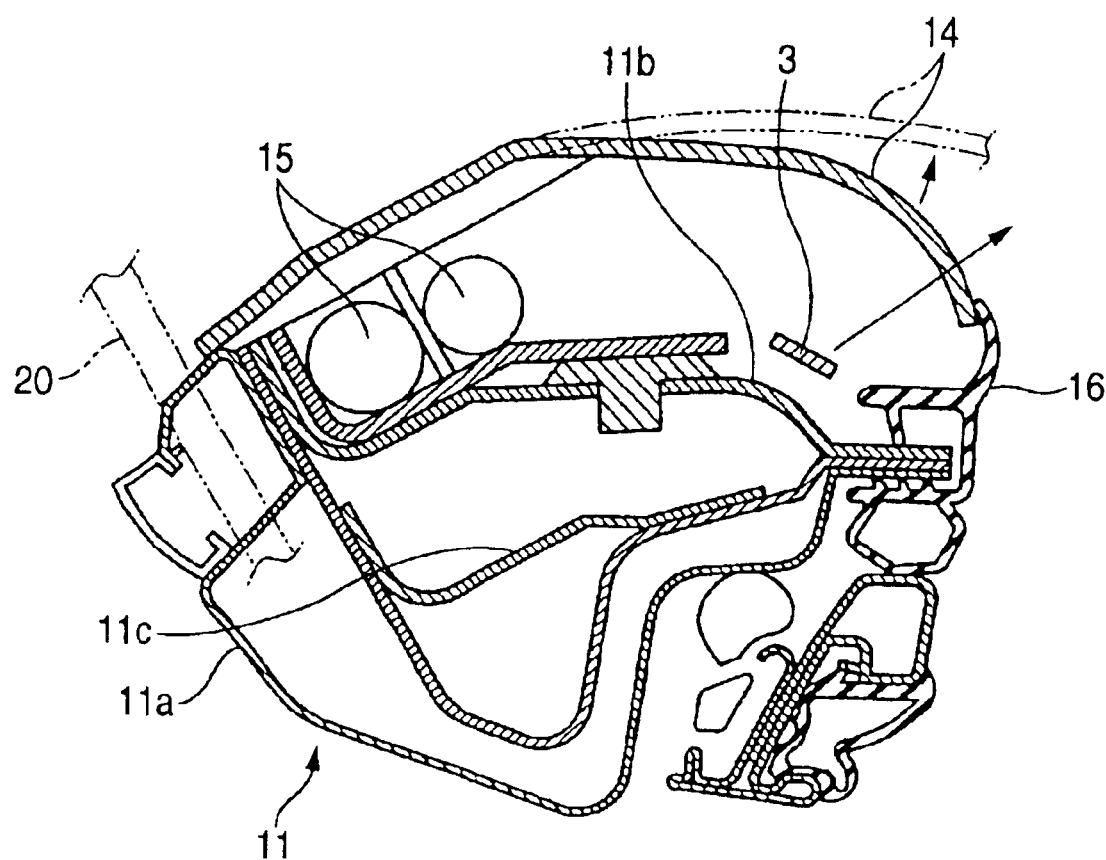
FIG. 11 is a view for explaining the problem of the related art.

First, explaining of a vehicular passenger protecting apparatus according to a first embodiment of the invention in reference to FIG. 1 through FIG. 6, FIG. 1 is a schematic sectional view showing a constitution of an essential portion thereof and is a view in correspondence with FIG. 11, FIG. 2 is a view showing to enlarge FIG. 1, FIG. 3 is a schematic view showing an example of a strap holding member, FIG. 4 is a schematic perspective view showing an edge portion of a pillar, FIG. 5 is a schematic view showing inside of a vehicular compartment and FIG. 6 is a schematic view showing other example of the strap holding member. Further, members similar to those in the prior art are attached with notations the same as those explained in the above-described prior art.

As shown by FIG. 1, the front pillar (pillar portion) 11 is constituted by the outer panel 11a, the inner panel 11b and the reinforcement 11c. The inner panel 11b is constituted by welding two sheets of panels $11b_1$, $11b_2$ in a shape of a closed section and the reinforcement 11c is provided at an inner portion of the inner panel 11b.

Further, a vehicular compartment outer side of the inner panel 11b is covered by the outer panel 11a. Meanwhile, a vehicular compartment inner side of the inner panel 11b is covered by the pillar trim (trim member) 14 and the harness 15 for an electric equipment is arranged between the pillar trim 14 and the inner panel 11b. The harness 15 is attached to the inner pillar 11b by a harness clip (harness holding member) 4, thereby, the harness 15 is fixed to inside of the front pillar 11. Further, the harness clip 4 may be provided over a total length of the front pillar 11 or may be provided at a predetermined portion thereof along the pillar 11 at an interval therebetween.

Further, a gap (opening) is formed by an edge portion of the inner panel 11b and the pillar trim 14. That is, the edge portion of the inner panel 11b is extended substantially in parallel with an edge of the pillar trim 14.

Further, the weather strip (seal member) 16 is fitted to the edge portion of the inner panel 11b and the gap between the inner panel 11b and the pillar trim 14 is closed by a tongue piece 16a provided at the weather strip 16. Further, the tongue piece 16a is molded by an elastic body of rubber, elastomer or the like.

Figure 9:
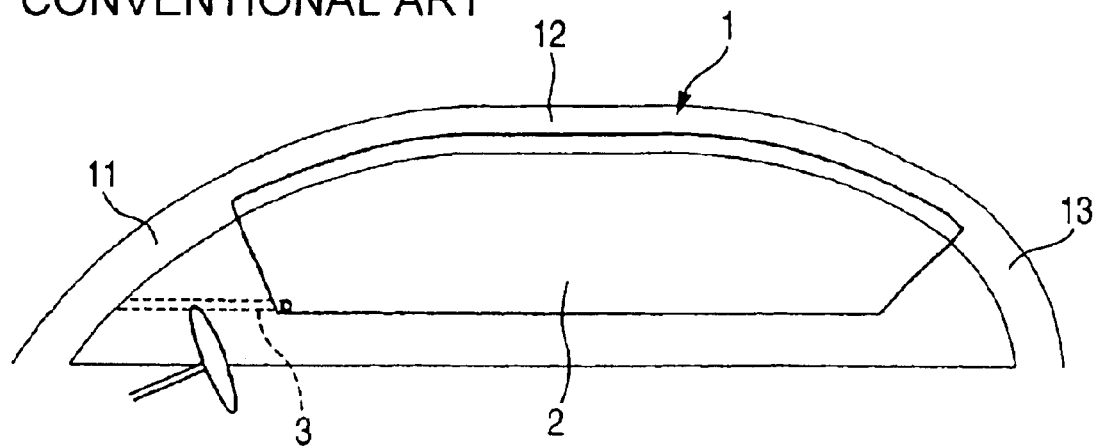
FIG. 9 is a view for explaining of a general curtain type air bag.
Figure 10:
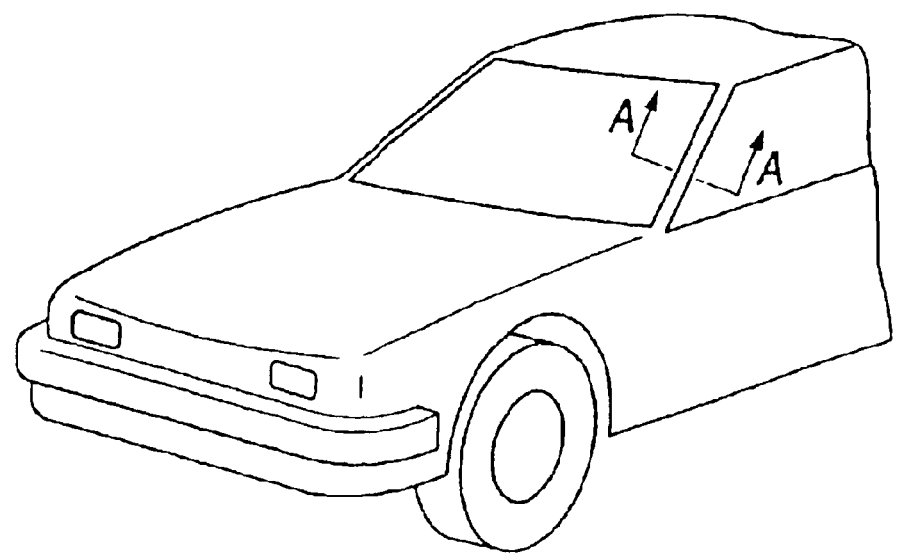
FIG. 10 is a view for explaining a problem of a related art.

Further, the vehicle is mounted with an air bag and the air bag main body 2 and/or an inflator or the like are stored in the side roof rail 22 between the front pillar 11 and the rear pillar 13. Further, when strong impact is effected from a side direction of the vehicle by collision or the like, the air bag is developed from an upper side portion of the vehicle to totally cover the side face of inside of the vehicular compartment (refer to FIG. 9).

Further, the front side lower end of the air bag main body 2 and the front pillar 11 are connected by the strap 3 and the strap 3 is arranged at inside of the pillar trim 14 along the front pillar 11.

Meanwhile, as shown by FIG. 2, at inside of a space closed by the front pillar 11 and the pillar trim 14, there is provided a clip 17 as a strap holding member for holding a middle portion of the strap 3 and a position of the strap 3 at inside of the space is regulated by the clip 17.

Explaining here of the clip 17, the clip 17 is a member integrally formed by sheet metal drawing or resin and as shown by FIG. 2 and FIG. 3, a section thereof is formed substantially in an S-like shape. Further, as shown by FIG. 3, the clip 17 includes an engaging portion (base portion) 17a for engaging with a pillar edge portion (edge portion of the inner pillar 11b) and a holding portion 17b for actually holding the strap 3. Further, the holding portion 17b is formed by cutting to rise a portion of the clip 17 and is constituted by a fold back portion 171 extended from the engaging portion 17a and a front end portion 172 formed toward the gap closed by the tongue piece 16a of the weather strip 16. Further, the holding portion 17b may be constituted not by cutting to rise the portion of the clip 17 but by dividing the portion respectively into portions thereof as shown by FIG. 6. Further, a front end 173 of the main body of the clip 17 is folded back in a direction reverse to that of the front end portion 172. That is, the front end 173 is formed by being folded back downwardly in FIG. 2 and the front end portion 172 is folded back upwardly, respectively.

Further, the holding portion 17b (the front end 173 and the front end portion 172) is attached to the edge portion of the front pillar 11 to constitute a state of being directed to the gap between the inner panel 11b and the pillar trim 14, which is a detaching direction (also is an inserting direction) of the strap 3.

Further, by forming the front end portions 172 and 173 of the clip to direct in directions reverse to each other (upward and rearward directions) as described above, insertion of the strap 3 is facilitated and the strap can firmly be held in integrating the strap 3 and when the air bag main body 2 is developed, the strap 3 is ejected firmly from between the pillar trim 14 and the inner panel 11b.

Further, as shown by FIG. 2, the panels $11b_1$ and $11b_2$ forming the inner pillar 11b are overlapped by each other at edge portions thereof, further, as shown by FIG. 4, a gap 18 is formed between the panels partially in the length direction of the front pillar 11. Further, by inserting the engaging portion 17a of the clip 17 into the gap 18, the clip 17 can easily be attached thereto. Further, the clip 17 may be attached by forming a hole portion in place of the gap 18 providing a projected portion at an end portion of the clip 17 and inserting the projected portion into the hole portion.

Further, also the weather strip 16 is fitted to the pillar edge portion to cover and overlap the engaging portion 17a of the clip 17 engaged with the pillar edge portion.

Thereby, the holding portion 17b of the clip 17 and the tongue piece 16a integrally formed with the weather strip 16 can accurately be positioned and the strap 3 can firmly be ejected from between the pillar trim 14 and the inner panel 11b.

Meanwhile, as shown by FIG. 5, a head lining 200 is arranged at a ceil portion in the vehicular compartment. The head lining 200 covers a total of the ceil and partially extended over to the front and rear pillar portions. Further, an extended portion 201 of the head lining 200 and the pillar trim 14 are integrated to overlap. Specifically, the extended portion 2ol of the head lining 200 is brought between the pillar trim 14 and the inner pillar 11b.

Further, at least one of the clips 17 is arranged at a vicinity of portions of the pillar trim 14 and the head lining 200 overlapping each other. In addition, according to the embodiment, the clip 17 is arranged only at the portions of the pillar trim 14 and the head lining overlapping each other.

The vehicular passenger protecting apparatus according to the first embodiment of the invention is constituted as described above and therefore, in operating the air bag main body, the air bag main body is expanded while stripping off a portion of the head lining 200 and the strap 3 connected to the air bag main body is pulled along therewith.

At this occasion, since the clip 17 is attached to constitute the state in which the detaching direction (inserting direction) of the strap 3 is directed to the gap between the inner panel 11b and the pillar trim 14, in developing to expand the air bag main body, the strap 3 is firmly ejected from the gap between the inner panel 11b of the front pillar 11 and the pillar trim 14.

Therefore, a situation in which the strap 3 is caught by the pillar trim 14 in developing to expand the air bag main body 2 can be avoided and the air bag main body 2 can be developed ideally (or, as designed).

Further, although the gap between the inner panel 11b and the pillar trim 14 is closed by the tongue piece 16a of the weather strip 16, since the tongue piece 16a is formed by an elastic body, the strap 3 can be ejected in developing the air bag main body 2 while achieving promotion of the outlook when the air bag main body 2 is not operated.

Particularly, by arranging the slip clip 17 at the portions of the pillar trim 14 and head lining 200 overlapping each other, at an initial stage of pulling out the strap 3, the strap 3 can firmly be pulled out from the gap. Further, thereafter, the strap 3 is ejected successively from the gap and therefore, the situation in which the strap 3 is caught by the pillar trim 14 can firmly be eliminated.

Further, there also achieves an advantage of capable of easily integrating the strap holding member to the edge portion of the inner panel 11b by applying the clip 17 as the strap holding member.

Further, according to the embodiment, there is achieved an advantage of capable of attaching the clip 17 by simple operation of inserting the engaging portion 17a of the clip 17 into the gap formed at the edge portions of the panels forming the inner pillar 11b.

Figure 7:
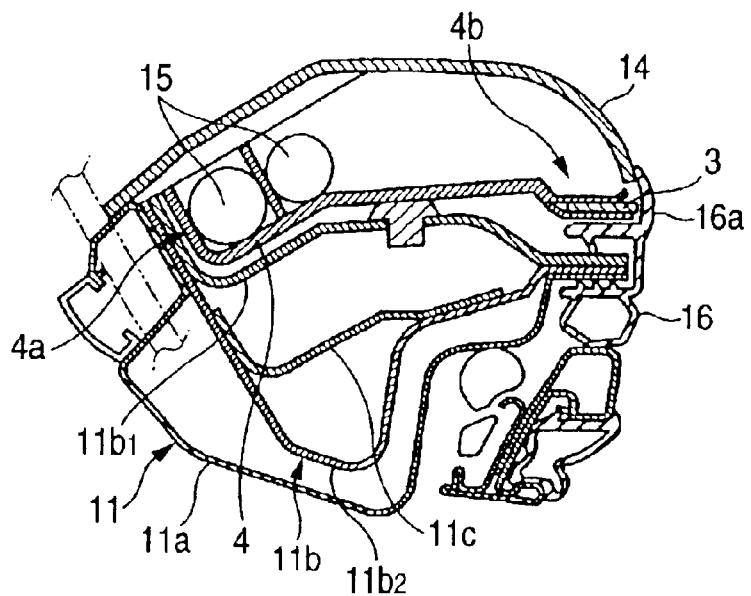
FIG. 7 is a schematic sectional view showing a constitution of an essential portion of a vehicular passenger protecting apparatus according to a second embodiment of the invention.
Figure 8:
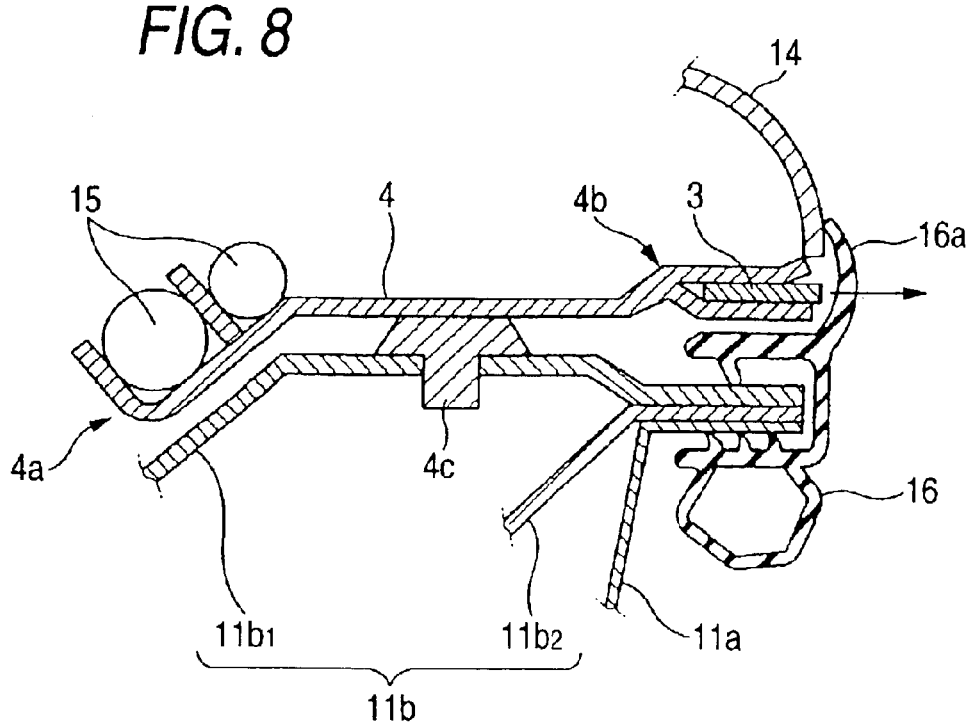
FIG. 8 is a schematic sectional view showing a constitution of essential portion of the vehicular passenger protecting apparatus according to the second embodiment of the invention and is a view showing to enlarge FIG. 7.

Next, explaining of a vehicular passenger protecting apparatus according to a second embodiment of the invention, FIG. 7 is a schematic sectional view showing a constitution of an essential portion thereof and is a view in correspondence with FIG. 1 and FIG. 11 and FIG. 8 is a view showing to enlarge FIG. 7.

Further, according to the second embodiment, in comparison with the above-described first embodiment, only a constitution of a strap holding member differs and the other portions are constituted similar to the first embodiment. Therefore, in the following, an explanation will be given only a portion thereof different from the first embodiment, similar notations are attached to portions thereof overlapping those of the first embodiment and an explanation thereof will partially be omitted.

As shown by FIG. 7 and FIG. 8, according to the second embodiment, a strap holding member is integrally formed with the harness clip (harness holding member) 4 for holding the harness 15. That is, as illustrated, a holding portion 4a for holding the harness 15 is formed at one end (left end of drawing) side of the harness clip 4 and a strap holding portion 4b for holding the strap 3 is formed at other end of the harness clip 4 and the strap holding portion 4b regulates a middle position of the strap 3 at inside of the front pillar 11 similar to the clip (refer to notation 17) according to the first embodiment.

Further, the harness clip 4 is integrally formed by resin or sheet metal drawing and is formed with a projected portion 4c at a lower face thereof as shown by FIG. 8. Further, by inserting the projected portion 4c into a hole portion provided at the inner panel 11b, the harness clip 4 is fixed.

Further, the strap holding portion 4b may be formed by cutting to rise a portion of the other end 4b of the harness clip 4 or may be formed by dividing the portion respectively into portions thereof similar to those explained in the first embodiment in reference to FIG. 3 to FIG. 6.

Further, the strap holding portion 4b is set to constitute a state in which the detaching direction (also inserting direction) of the strap 3 is directed to the gap between the inner panel 11b and the pillar trim 14. Further, thereby, insertion of the strap 3 is facilitated and the strap 3 can firmly be held in integrating the strap 3 and in developing the air bag, the strap 3 is ejected firmly from between the pillar trim 14 and the inner panel 11b.

Further, the harness clip 4 is engaged with the inner panel 11b via the projected portion 4c and the weather strip 16 is fitted to the pillar edge portion of the inner panel 11b. Thereby, the strap holding portion 4b of the harness clip 4 can accurately be positioned in alignment with the tongue piece 16 a integrally formed with the weather strip 16 and it is possible for the strap 3 to reliably be ejected from between the pillar trim 14 and the inner panel 11b.

Further, it is not necessary to provide the strap holding portion 4b to a total of the harness clip 4 but the strap holding portion 4b may be provided in the harness clip 4 at least at a vicinity of portions of the pillar trim 14 and the head lining 200 overlapping each other.

The vehicular passenger protecting apparatus according to the second embodiment of the invention is constituted as described above and therefore, operation and effect similar to those of the above-described first embodiment are achieved and further, the strap 3 is held by using the harness clip 4 and therefore, there is achieved an advantage of capable of reducing a number of parts and achieving a reduction in a number of integrating steps and cost.

Further, the invention is not limited to the above-described embodiments but can variously be modified within a range not deviated from the gist of the invention. For example, although according to the above-described respective embodiment, an explanation has been given of a case of applying the invention to the front pillar 11, the invention may be applied to the rear pillar.

As described above in details, according to the vehicular passenger protecting apparatus of the invention, in developing the air bag main body, the strap is firmly pulled out from the gap between the trim member and the pillar portion, the trim member can firmly be prevented from being stripped off and development of the air bag can be made ideal.

According to the vehicular passenger protecting apparatus of the invention, by arranging the strap holding member at the vicinity of portions of the trim member and the head lining overlapping each other, at an initial stage of pulling out the strap, the strap is pulled out firmly from the gap, thereafter, the strap comes out successively from the gap and therefore, a situation in which the strap is caught by the trim member can firmly be eliminated.

Further, according to the vehicular passenger protecting apparatus of the invention, by applying the invention to the clip attached to the edge portion of the pillar portion as the strap holding member, there is achieved an advantage of capable of easily integrating the strap holding member to the edge portion of the pillar portion.

Further, according to the vehicular passenger protecting apparatus of the invention, by using the harness holding member as the strap holding member, there is achieved an advantage of capable of reducing a number of parts and achieving a reduction in a number of integrating steps and costs.

What is claimed is:

1. A vehicular passenger protecting apparatus, comprising:
    an air bag main body to be expanded to spread from an upper side of a side portion of a vehicle to an inside of a vehicular compartment;
    a pillar portion of the vehicle;
    a trim member for covering a vehicular compartment inner side of the pillar portion of the vehicle and forming a gap between the trim member and the pillar portion;
    a strap arranged at an inside of a space surrounded by the pillar portion and the trim member, the strap connecting the air bag main body and the pillar portion; and
    a strap holding member arranged at the inside of the space, the strap holding member holding the strap releasably in a predetermined direction;
    wherein the strap holding member is disposed to direct in the predetermined direction towards the gap.

2. The vehicular passenger protecting apparatus according to claim 1, further comprising:
    a seal member having a tongue piece for covering the gap.

3. The vehicular passenger protecting apparatus according to claim 2, wherein
    the seal member includes a weather strap attached to an edge portion of the pillar portion; and
    the tongue piece is molded integrally with the weather strap.

4. The vehicular passenger protecting apparatus according to claim 1, further comprising:
    a head lining disposed on an inner side of a ceil portion of the vehicular compartment;
    wherein the strap holding member is disposed in the vicinity of a potion where the trim member and the head lining overlap each other.

5. The vehicular passenger protecting apparatus according to claim 1, wherein the strap holding member includes a clip attached to an edge portion of the pillar portion.

6. The vehicular passenger protecting apparatus according to claim 5,
wherein
the edge portion of the pillar portion is formed by overlapping a plurality of panels; and
an end portion of the clip is inserted between the panels.

7. The vehicular passenger protecting apparatus according to claim 5,
wherein
a recessed portion or a projected portion is provided at the edge portion of the pillar portion; and
an end portion of the clip is formed with a projected portion or a recessed portion to be respectively engaged with the recessed portion or the projected portion of the edge portion of the pillar portion.

8. The vehicular passenger protecting apparatus according to claim 5,
wherein
the clip comprises a clip base portion for being engaged with a pillar base portion of the pillar portion, and a holding portion for holding the strap; and
the clip base portion and the holding portion are formed to constitute an S-like shape.

9. The vehicular passenger protecting apparatus according to claim 8,
wherein
the holding portion comprises a holding portion base portion,
a fold back portion extended from the holding portion base portion, and a front end portion formed to direct to the gap.

10. The vehicular passenger protecting apparatus according to claim 1,
wherein the strap holding member includes a harness holding member for holding a harness arranged at the inside of the space.

11. A vehicular passenger protecting apparatus, comprising:
an air bag main body to be expanded to spread from an upper side of a side portion of a vehicle to an inside of a vehicular compartment;
a pillar portion of the vehicle;
a trim member for covering a vehicular compartment inner side of the pillar portion of the vehicle and forming a gap between the trim member and the pillar portion;
a seal member having a tongue piece for covering the gap;
a strap arranged at an inside of a space surrounded by the pillar portion and the trim member, the strap connecting the air bag main body and the pillar portion; and
a strap holding member arranged at the inside of the space and attached to an edge portion of the pillar portion;
wherein
the strap holding member includes a holding portion for holding the strap releasably, the holding portion directing towards the gap;
the edge portion of the pillar portion is extended in the same direction as the holding portion; and
the seal member is attached to the edge portion of the pillar portion to cover a portion where the strap holding member is attached.

12. The vehicular passenger protecting apparatus according to claim 11, further comprising:
a head lining disposed on an inner side of a ceil portion of the vehicular compartment;
wherein the strap holding member is disposed in the vicinity of a potion where the trim member and the head lining overlap each other.

13. The vehicular passenger protecting apparatus according to claim 11,
wherein
the edge portion of the pillar portion is formed by overlapping a plurality of panels; and
an end portion of the clip is inserted between the panels.

14. A vehicular passenger protecting apparatus, comprising:
an air bag main body to be expanded to spread from an upper side of a side portion of a vehicle to an inside of a vehicular compartment;
a pillar portion of the vehicle;
a trim member for covering a vehicular compartment inner side of the pillar portion of the vehicle and forming a gap between the trim member and the pillar portion;
a seal member having a tongue piece for covering the gap;
a strap arranged at an inside of a space surrounded by the pillar portion and the trim member, the strap connecting the air bag main body and the pillar portion; and
a strap holding member arranged at the inside of the space and attached to the pillar portion;
wherein
the strap holding member includes a strap holding portion for holding the strap releasably and a harness holding portion for holding a harness arranged in the space, the strap holding portion directing towards the gap;
the edge portion of the pillar portion is extended in the same direction as the strap holding portion; and
the seal member is attached to the edge of the pillar portion.

15. The vehicular passenger protecting apparatus according to claim 14, further comprising:
a head lining disposed on an inner side of a ceil portion of a vehicular compartment;
wherein the strap holding member is disposed in the vicinity of a portion where the trim member and the head lining overlap each other.

* * * * *